(12) United States Patent
Hume et al.

(10) Patent No.: US 11,644,432 B2
(45) Date of Patent: May 9, 2023

(54) METHOD OF CHARACTERIZING, DISTINGUISHING, AND MEASURING A CONTACT REGION

(71) Applicant: Thermtest Inc., Fredericton (CA)

(72) Inventors: Dale Hume, Fredericton (CA); David Landry, Cumberland Bay (CA); Andrew Evans, Fredericton (CA)

(73) Assignee: Thermtest, Inc., Fredericton (CA)

(*) Notice: Subject to any disclaimer, the term of this patent is extended or adjusted under 35 U.S.C. 154(b) by 315 days.

(21) Appl. No.: 16/902,822

(22) Filed: Jun. 16, 2020

(65) Prior Publication Data
US 2021/0389263 A1 Dec. 16, 2021

(51) Int. Cl.
*G01N 25/72* (2006.01)
*G01N 15/08* (2006.01)
*G01N 25/18* (2006.01)

(52) U.S. Cl.
CPC ............ *G01N 25/72* (2013.01); *G01N 15/08* (2013.01); *G01N 25/18* (2013.01)

(58) Field of Classification Search
USPC ........................................................ 374/1, 43
See application file for complete search history.

(56) References Cited

U.S. PATENT DOCUMENTS

| | | | | |
|---|---|---|---|---|
| 11,371,949 B1 * | 6/2022 | Reyes | ............... | G01N 25/18 |
| 2013/0107004 A1 * | 5/2013 | Maeda | ............... | G01B 11/16 |
| | | | | 348/46 |

FOREIGN PATENT DOCUMENTS

| | | | | |
|---|---|---|---|---|
| CN | 107688039 A | * | 2/2018 | ............ G01N 25/00 |
| DE | 102016214137 A1 | | 12/2017 | |
| EP | 3141890 A1 | * | 3/2017 | |
| EP | 3158925 A1 | * | 4/2017 | ......... A61B 18/1492 |
| JP | 2015152397 A | * | 8/2015 | ............ G01N 15/08 |
| WO | 2011065877 A1 | | 6/2011 | |

OTHER PUBLICATIONS

Translation of DE102016214137A1 (Year: 2017).*
Search Report from counterpart European Application No. 21 17 9742 dated Oct. 8, 2021, 4 pp.

* cited by examiner

*Primary Examiner* — Mirellys Jagan
(74) *Attorney, Agent, or Firm* — Shumaker & Sieffert, P.A.

(57) ABSTRACT

Methods of determining thermal properties of a contact region are provided. The method comprises receiving temperature data of a sensor; determining a temperature distribution of heat penetration from a sensor to at least one material; applying a correction to the temperature distribution; iteratively analyzing the corrected temperature distribution; and outputting thermal properties of a contact region, the contact region being a region between the sensor and the at least one material. The method may further comprise determining thermal properties of the at least one material; and determining corrected thermal properties of the material using the thermal properties of the contact region. The method may further comprise automatically determining an appropriate time window for measuring properties of the at least one material to minimize effects of the contact region.

20 Claims, 9 Drawing Sheets

METHOD OF CHARACTERIZING, DISTINGUISHING, AND MEASURING A CONTACT REGION

TECHNICAL FIELD

The present disclosure relates to thermal property measurement, and in particular to thermal property measurements of the contact region between materials in contact.

BACKGROUND

Materials in contact can be analysed for their thermal properties, such as surface and bulk material effusivities. When materials in contact are analysed for their thermal properties, the physical contact between the materials is not taken into consideration. A combination of bulk material properties and surface properties is usually measured without distinguishing the bulk material properties from the surface or contact properties. It will be appreciated that the physical contact between the two or more materials in contact can have an effect on the analysed thermal properties of the materials. For example, the porosity, heterogeneity and/or surface imperfections of one or more of the materials can significantly change the thermal properties of a material.

Accordingly, methods for characterizing, distinguishing and measuring thermal properties of contact between materials is desired.

SUMMARY

In accordance with one aspect of the present disclosure, a method is disclosed, the method comprising: receiving temperature data of a sensor; determining a temperature distribution of heat penetration from a sensor to at least one material; applying a correction to the temperature distribution; iteratively analyzing the corrected temperature distribution; and outputting thermal properties of a contact region, the contact region being a region between the sensor and the at least one material.

In the method, the temperature data may be the temperature of the sensor with time.

In the method, the contact region may include the sensor and may be between two of the at least one materials.

In the method, the iterative analysis may be a non-linear fitting analysis.

The method may further comprise determining thermal properties of the at least one material; and determining corrected thermal properties of the at least one material using the thermal properties of the contact region.

The method may further comprise automatically determining an appropriate time window for measuring properties of the at least one material to minimize effects of the contact region.

In the method, there may be a thin film between the sensor and the at least one material. The method may further comprise determining thermal properties of the thin film.

In accordance with another aspect of the present disclosure, a method is disclosed, the method comprising receiving temperature data of a sensor; determining a temperature distribution of heat penetration from a sensor to two or more materials; applying a correction to the temperature distribution; determining thermal properties of a contact region, the contact region being a region between each of the two or more materials; and outputting the thermal properties of the contact region.

In the method, the temperature data may be the temperature of the sensor with time.

In the method, the sensor may be in the contact region.

The method may further comprise iteratively analyzing the corrected temperature distribution before determining the thermal properties of the contact region. The iterative analysis being a non-linear fitting analysis.

The method may further comprise determining thermal properties of the two or more materials; and determining corrected thermal properties of the two or more materials using the thermal properties of the contact region.

The method may further comprise automatically determining an appropriate time window for measuring properties of the two or more materials to minimize effects of the contact region.

In the method, there may be at least one thin film between the sensor and at least one of the two or more materials. The method may further comprise determining thermal properties of the at least one thin film.

In accordance with another aspect of the present disclosure, a method is provided, the method comprising: arranging a sensor in a contact region between a first material and a second material; heating the sensor for a predetermined time; determining a temperature distribution of heat penetration of the sensor to the first material or the second material; iteratively analyzing the temperature distribution; and determining thermal properties of the contact region, the contact region being a region between the first material and the second material.

The method may further comprise applying a correction to the temperature distribution before iteratively analyzing the temperature distribution.

The method may further comprise determining thermal properties of the first material and the second material; and determining corrected thermal properties of the first material and the second material using the thermal properties of the contact region.

The method may further comprise automatically determining an appropriate time window for measuring properties of the first material and the second material to minimize effects of the contact region.

In the method, there may be at least one thin film between the sensor and at least one of the first material and the second material. The method may further comprise determining thermal properties of the at least one thin film.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Methods and models for determining thermal properties of a contact region are disclosed herein. The method comprises receiving temperature data of a sensor, and determining a temperature distribution of heat penetration from a sensor to at least one material. A correction term is then applied to the temperature distribution to determine a corrected temperature distribution. The corrected temperature distribution is iteratively analysed, and thermal properties of at least one contact region are output. The contact region may be a region between the two materials. The contact region includes the region between the sensor and the at least one material.

The method of determining thermal properties of a contact region between two materials may be applied using a thermal contact model. The method can also be considered a method of determining contact properties between planes of materials. The thermal contact model is further explained below.

As described above, when materials in contact are analysed for their thermal properties, the physical contact between the materials is not taken into consideration. It will be appreciated that the physical contact between the two or more materials in contact can have an effect on the analysed thermal properties of the materials, in particular the porosity, heterogeneity and/or surface imperfections of one or more of the materials. The methods and models described herein can be used for experimental measurements of varying materials and surfaces. The surface or contact thermal properties (for example, the thermal effusivity) and bulk material thermal properties can both be extracted from a plane source measurement of thermal properties.

To calculate and measure thermal properties of materials or bodies in contact, the thermal contact between the materials and the surface effusivity can be characterized, distinguished, and measured using the methods and models described herein which may be derived from thermal waves. It will be appreciated that thermal reflections can provide a useful method for modeling the transport of heat across material interfaces. When thermal waves encounter the interface between two materials, they undergo reflection and transmission. The coefficients and properties of reflection and transmission for a thermal wave (with amplitude in temperature) traveling from a first material into a second material can be used to determine a time evolution of arbitrary temperature distributions, for example, through a method of images. This is at least in part because it is possible to decompose temperature distributions into a collection of thermal waves and because the coefficients of reflection and transmission are frequency-independent for thermal waves at the interface of two materials.

Figure 1:
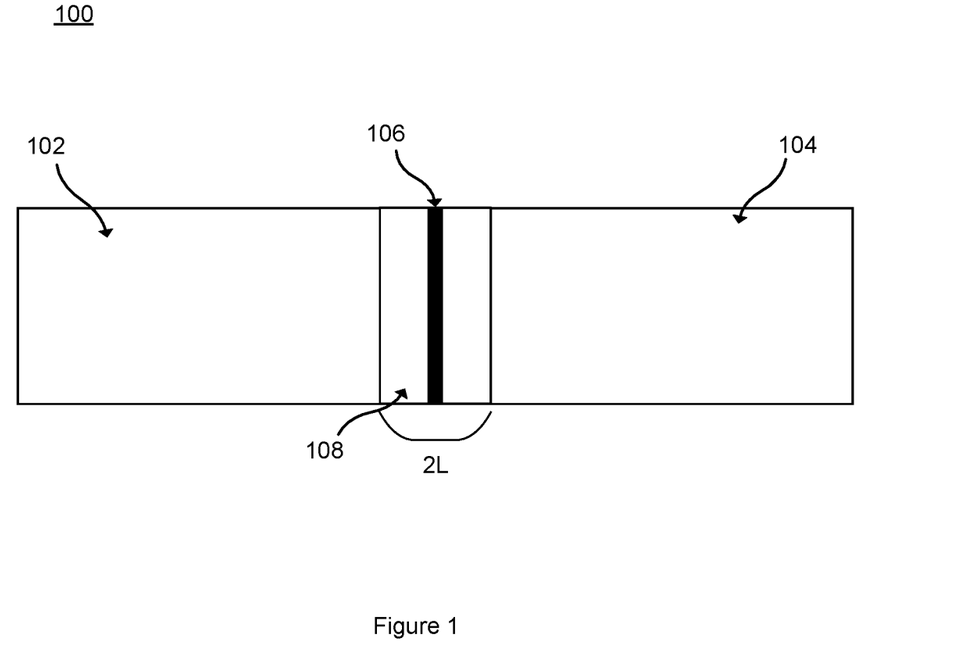
FIG. 1 depicts a thermal contact model.

FIG. 1 depicts a thermal contact model 100. The thermal contact model is a 1-dimensional model which can be used to characterize the effects of imperfect contact between materials, for example on transient plane source methods. The thermal contact model 100 comprises a first material 102 and a second material 104. The materials 102, 104 may both be the same bulk sample material with a thermal effusivity $b_2$ and diffusivity $\alpha_2$. It will appreciated that the materials 102 and 104 may each be a different material with different thermal effusivities and diffusivities, as further described below. A sensor 106 is placed between the materials 102, 104 in a contact region 108. The sensor 106 may be a planar sensor which is embedded or sandwiched in the center of the contact region 108 between the two materials 102, 104. The sensor 106 may be a heat source that is heated with constant power for a predetermined amount of time.

The contact region 108 may be a thin region with a width of 2L and thermal effusivity $b_1$. The contact region 108 may be considered as a thin barrier separating the materials 102, 104, representing the surfaces of the materials 102, 104 in contact. It will be appreciated that this approximation can allow for the sensor 106 and the region of contact 108 between the materials 102, 104 to be treated as a single homogeneous layer.

Although the contact region 108 in the model 100 is represented as a single homogeneous layer, it may be more accurately described as a series of layers with different thermal properties. It will be appreciated that if these layers are sufficiently thin, and after a long enough heating time, the single-layer approximation holds. Multi-layered interfaces may give frequency-dependent reflections due to interference, however this has little, effect on the low frequency components of the heating process, which for a constant power source can dominate heat transfer after a short time.

For the calculations and measurements using the thermal contact model 100, the sensor 106 or heating element is located at x=0, creating a symmetric situation. The material 102, 104 is introduced in the x direction when |x|>L.

The thermal contact model 100 may be used to measure and calculate various thermal properties of the contact region 108 and the materials 102, 104, as described above and further below. It will be appreciated that a method of images with reflection coefficients can be used to calculate or determine the temperature distribution of the model 100. In some embodiments, the width 2L of the contact region 108 is not known. Without a method of measuring L directly, the diffusivity of the contact region 108 cannot be easily obtained. Instead, an equation for the temperature of the sensor 106 can be defined in terms of a time constant. The time constant may be selected to be for example, $$t_L = \frac{L^2}{\alpha_1}.$$

Using such a time constant, the temperature of the sensor 106 may be represented as Equation 1:

$$T_{1D}(t) = \frac{P}{b_1}\sqrt{\frac{t}{\pi}}\left\{1 + 2\sum_{n=1}^{\infty}\left(\frac{b_1 - b_2}{b_1 + b_2}\right)^n\left[\exp\left(\frac{-n^2 t_L}{t}\right) - n\sqrt{\frac{\pi t_L}{t}}\operatorname{erfc}\left(n\sqrt{\frac{t_L}{t}}\right)\right]\right\} \quad (1)$$

Where P is the power supplied to the system, t is the time, $b_1$ and $b_2$ are the thermal effusivities of the contact region 108 and the material 102, 104, respectively, and $t_L$ is the time constant. The time constant may be used to identify an earliest time at which the thermal contact model 100 or existing thermal property determination methods can be considered valid.

An automatic determination of the time window for which data in previous methods should be considered can be done by the present invention using the time constant. This time window represents when the contact offset will be constant. The data in this time window is considered as the valid data for determining the thermal properties in existing property determination methods. The valid data may be considered as data where the effect of the contact between the materials is minimal on the thermal properties of the materials.

The time constant, $t_L$, can also be used to derive the thermal contact conductance coefficient H and heat capacity per unit area $\xi$ of the contact region 108 between a side of the sensor 106 and the material 104. The thermal contact conductance coefficient H is the inverse of thermal contact resistance.

It will be appreciated that although the above derivation relies on a 1-D model 100, the derivation can also be used to obtain an approximate correction term for higher dimensional models, such as a planar disk source, over sufficiently short test times. The correction term representing the effects of the contact between materials and the effects of the sensor itself. If the heat transfer remains approximately 1-D until the time (t) is greater than the time constant ($t_L$) (i.e $t \gg t_L$), the contact correction will reach a constant offset before higher dimensional effects become relevant, as the temperature of the sensor can be found with:

$$T_{1D}(t \gg t_L) = \frac{P}{b_2}\sqrt{\frac{t}{\pi}} + \frac{P\sqrt{t_L}}{2b_1}\left[1 - \left(\frac{b_1}{b_2}\right)^2\right] \quad (2)$$

It will be further appreciated that if the heat transfer in the contact model 100 remains predominantly 1-dimensional until $t \gg t_L$, a contact correction term of $$T_C(t) = T_{1D}(t) - \frac{P}{b_2}\sqrt{\frac{t}{\pi}}$$

can be applied directly to a 3-dimensional model for plane sources, and is written as Equation 3:

$$T_C(t) = P\sqrt{\frac{t}{\pi}} \quad (3)$$

$$\left\{\frac{1}{b_1} - \frac{1}{b_2} + \frac{2}{b_1}\sum_{n=1}^{\infty}\left(\frac{b_1-b_2}{b_1+b_2}\right)^n\left[\exp\left(\frac{-n^2 t_L}{t}\right) - n\sqrt{\frac{\pi t_L}{t}}\operatorname{erfc}\left(n\sqrt{\frac{t_L}{t}}\right)\right]\right\}$$

Where P is the power supplied to the system, t is the time, $b_1$ and $b_2$ are the thermal effusivities of the contact region 108 and the material 102, 104, respectively, and $t_L$ is the time constant.

The correction term ($T_C(t)$ can be applied to a transient plane source model (3-D model) with a temperature rise of $T_{mdl}(t)$. The corrected form of the model may be found using Equation 4:

$$T_{3D}(t) = T_{mdl}(t) T_C(t) \quad (4)$$

For a disk-shaped heat source and an isotropic sample, $T_{mdl}(t)$ may be written as Equation 5:

$$T_{mdl}(t) = P_0(\pi^{3/2} R \cdot \lambda_2)^{-1} D_S(\sqrt{t\alpha_2}/R) \quad (5)$$

$$D_S(\tau) = \int_0^\tau d\sigma\sigma^2 \int_0^1 v dv \int_0^1 u du \cdot \exp\left(\frac{-(u^2+v^2)}{4\sigma^2}\right) I_0\left(\frac{uv}{2\sigma^2}\right).$$

Where $\lambda_2$ is the thermal conductivity of the sample material, and $I_0$ is the modified Bessel function of the first kind.

The above thermal contact model 100 can be used to determine thermal properties of the contact region 108 or the surfaces of the materials 102, 104. This may be done by iteratively analysing Equation 4 above. The iterative analysis may be a non-linear fitting analysis. The iterative analysis can be used to isolate the thermal properties of the contact region 108. To perform the iterative analysis accurately and efficiently, a computer is used. The computer automatically, efficiently and accurately iteratively analyses the data. It will be appreciated that a non-linear fitting analysis is also done for the 1-dimensional model of the equations.

By determining the thermal properties of the contact region 108, the thermal properties of the materials 102, 104 may be more accurately determined. This may be done because in previous methods, the effects of the contact region or surface of materials are not considered when modelling transient plane sources, as described above. The present method considers the effects of contact between the materials using the correction term for the model 100. The determined thermal properties of the contact region may include, but are not limited to, thermal contact conductance, the contact region's inverse thermal contact resistance, and heat capacity per unit area.

Figure 2:
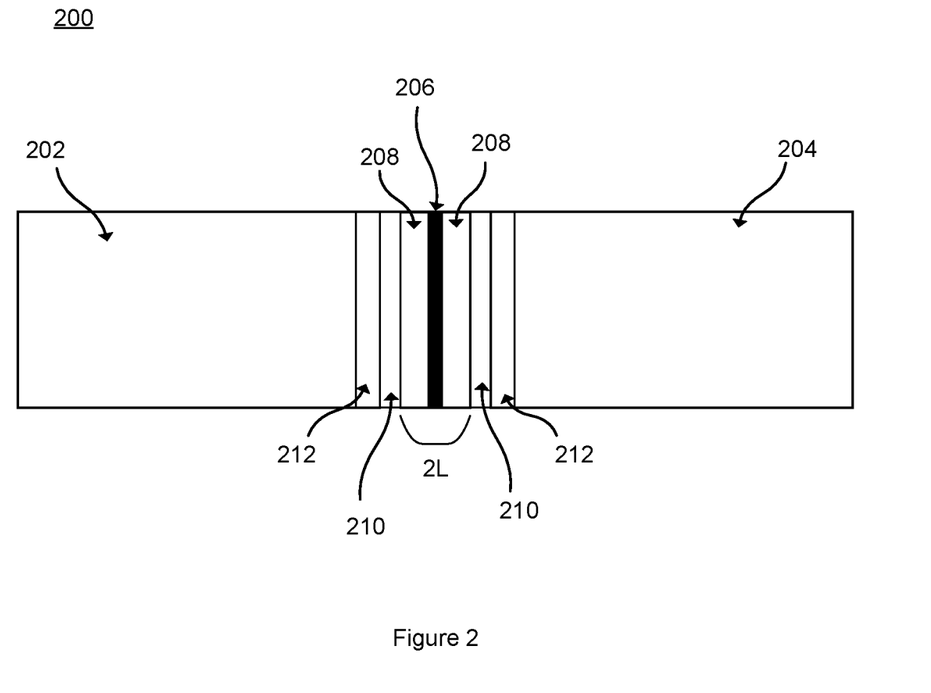
FIG. 2 depicts an embodiment of a thermal contact model using thin film.

FIG. 2 depicts an embodiment of a thermal contact model 200 using a thin film 210. The thermal contact model 200 is similar to thermal contact model 100. The thermal contact model 200 comprises a first material 202 and a second material 204. The materials 202, 204 may be the same bulk sample material with a thermal effusivity $b_2$ and diffusivity $\alpha_2$. It will appreciated that the materials 202 and 204 may each be a different material with different thermal effusivities and diffusivities. A sensor 206 is placed between the materials 202, 204. The contact model 200 further comprises a thin film 210 placed between the material 202 and the sensor 206, and between the material 204 and the sensor 206. Between the two thin films 210 there is a contact region 208, and between the materials 202, 204 and the thin films 210 there are contact regions 212. The thin film 210 can be said to have good contact with the sensor 206. However, it will be appreciated that in other embodiments the contact between the thin film 210 and the sensor 206 may not be considered as a good contact. The contact regions 208 and the contact regions 212 may have different properties or may have the same properties.

The sensor 206 may be a planar sensor which is embedded or sandwiched in the center between the thin films 210 and the two materials 202, 204. The sensor 206 may be a heat source that is heated with constant power for a predetermined amount of time. Similar to the thermal contact model 100, the contact regions 208 and 212 may be thin regions and have a thermal effusivity that is different from the materials 202, 204 and from the thin film 210.

When the thin film 210 is said to have good contact with the sensor 206, the thermal properties of the thin film 210 may be found in a way similar to the model 100 described above. Thermal properties of the thin film 210 may be found following the method of the contact model 100, however, the reflection coefficients (R) are replaced by an appropriate effective R and are then inserted into at least Equation 5. The difference between a width of the thin film 210 at the contact region 212 from the sensor 206 and a width of the thin film 210 at the contact region 208 from the sensor 206 (the difference being an approximate width of the thin film 210), should be known to calculate the thermal properties of the thin film 210. It will be appreciated that without a method of measuring a width of the thin film 210 directly, a time constant may be selected for use in the method and model, as described above.

The contact model 200 can also be used to measure the properties of the contact region 212. It will be appreciated that if the thin film 210 were instead a sample material having a similar size as the materials 202, 204 and with known properties, the properties of the contact region 208 may be calculated using a shorter test time. This short test time may allow for the heat from the sensor 206 to not interact with the contact region 212 and the materials 202, 204. A longer test time may then be used to calculate the properties of the contact region 212. Such a method would allow for the properties of contact between any two sample materials, not just the properties of the contact between a sensor and sample material.

The thermal contact model 200 may be used to measure and calculate various thermal properties of the materials 202, 204, the thin film 210, the contact regions 208, and the contact regions 212, as described above. For the calculations and measurements using the thermal contact model 200, the sensor 206 or heating element is located at x=0, creating a symmetric situation similar to contact model 100. In the above equations, the thermal effusivity of the thin film 210 may be represented as $b_1$ which is the thermal effusivity of the contact region 108 above.

Figure 3:
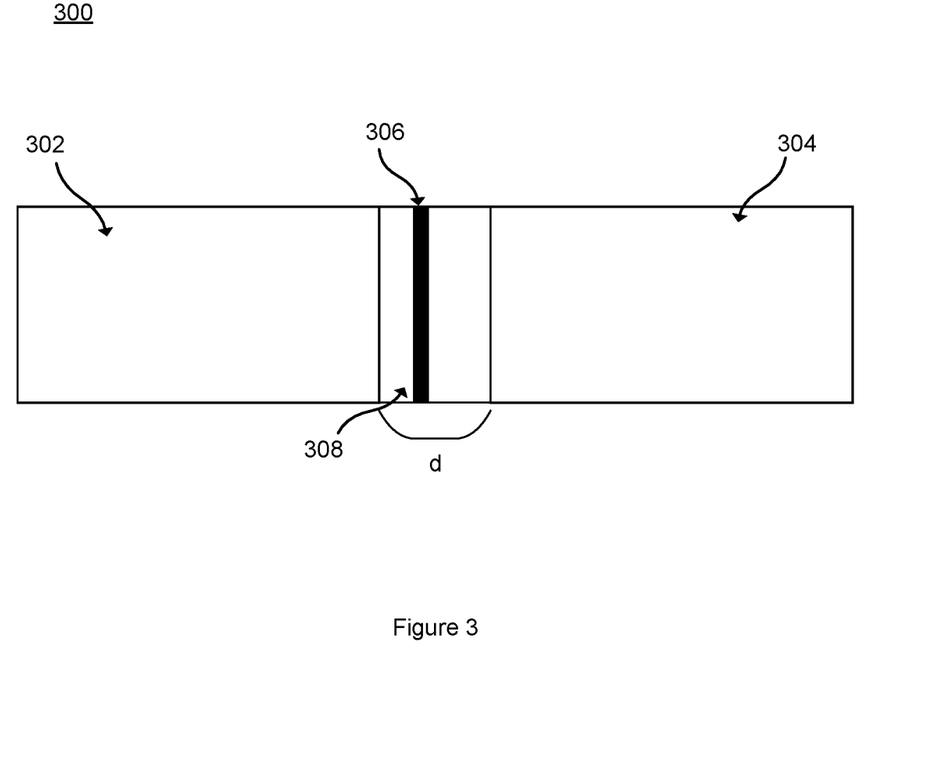
FIG. 3 depicts an embodiment of a thermal contact model using a layered system.

FIG. 3 depicts an embodiment of an asymmetrical thermal contact model 300. In the thermal contact model 300, there is a first material 302 and a second material 304 which are each in contact with a sensor 306. The material 302 may be a different material from material 304 with different thermal effusivities. The sensor 306 may be a planar sensor which is embedded or sandwiched in the contact region 308 between the first and second materials 302, 304. The sensor 306 may be a heat source that is heated with constant power for a predetermined amount of time. The contact region 308 may be a thin region with a total width of d ($w_1+w_2=d$), and a thermal effusivity $b_1$, where the width from the sensor 306 to material 302 is $w_1$ and the width from the sensor 306 to material 304 is $w_2$.

The contact region 308 consists of the sensor 306 and the two physical contact regions of the materials 302, 304. The source of heat or sensor 306 is not necessarily placed in the middle of the contact region 308, as shown in FIG. 3. It will be appreciated that although the sensor 306 is not necessarily centered between the first and second materials 302, 304, the sensor 306 is considered to be at x=0, when applying the model. Similar to the above models 100, 200, the contact region 308 may be considered as a thin barrier separating the materials 302, 304, representing the surfaces of the materials 302, 304 in contact. It will be appreciated that this approximation can allow for the sensor 306 and the region of contact 308 between the materials 302, 304 to be treated as a single homogeneous layer.

Although the contact region 308 in the model 300 is represented as a single homogeneous layer, it may be more accurately described as a series of layers with different thermal properties. It will be appreciated that if these layers are sufficiently thin, and after a long enough heating time, the single-layer approximation holds.

The thermal contact model 300 may be used to measure and calculate various thermal properties of the materials 302, 304, and the contact region 308, as described above. For the calculations and measurements using the thermal contact model 300, the sensor 306 or heating element is located at x=0. It will be appreciated that the temperature at the sensor 306 follows Equation 6:

$$T_{Total} = T_{3D} + \sum_{n=1}^{\infty} 2R_{21}^n R_{23}^n T(2nd) + \qquad (6)$$
$$R_{21}^n R_{23}^{n-1} T(2(w_1 + (n-1)d)) + R_{21}^{n-1} R_{23}^n T(2(w_2 + (n-1)d))$$

Where T(x) follows equation 7:

$$T_{cnst}(x, t) = \frac{P}{b}\left[\sqrt{\frac{t}{\pi}} e^{\frac{-x^2}{4\alpha_t}} - \frac{|x|}{2\sqrt{\alpha}} \text{erfc}\left(\frac{|x|}{4\sqrt{\alpha_t}}\right)\right] \qquad (7)$$

and $R_{ij}$ is a coefficient of reflections for a thermal wave (with amplitude in temperature) traveling from a first material into a second material.

As described above, the widths $w_1$ and $w_2$ may not be known, as these widths represent the contact region 308 which is a thin region. It will be appreciated that the Equations 6 and 7 can be refactored to remove $w_1$ and $w_2$, as shown below in Equations 8, 9, and 10:

$$T(2nd) = \frac{P}{b}\left(\sqrt{\frac{t}{\pi}} * e^{-\frac{n^2 t_L}{t}} - n\sqrt{t_L} * \text{erfc}\left(n\sqrt{\frac{t_L}{t}}\right)\right) \qquad (8)$$

$$T(2(w_1 + (n-1)d)) = \frac{P}{b}\left(\sqrt{\frac{t}{\pi}} * e^{-\left(\sqrt{\frac{t_w}{t}} + (n-1)\sqrt{\frac{t_L}{t}}\right)^2} - \qquad (9)\right.$$
$$\left.\left(\sqrt{t_w} + (n-1)\sqrt{t_L}\right) * \text{erfc}\left(\sqrt{\frac{t_w}{t}} + (n-1)\sqrt{\frac{t_L}{t}}\right)\right)$$

$$T(2(w_2 + (n-1)d)) = \qquad (10)$$
$$\frac{P}{b}\left(\sqrt{\frac{t}{\pi}} * e^{-\left(-\sqrt{\frac{t_w}{t}} + n\sqrt{\frac{t_L}{t}}\right)^2} - \left(-\sqrt{t_w} + n\sqrt{t_L}\right) * \text{erfc}\left(-\sqrt{\frac{t_w}{t}} + n\sqrt{\frac{t_L}{t}}\right)\right).$$

Where $t_w$ is a time constant for heat penetration. In some embodiments, the properties of the material 302 are known. Further, temperature of the sensor may be fit into the above equations using a non linear fitting technique. It will be appreciated that the non linear fitting technique is done for the 3-D models and for the 1-D models.

Figure 4:
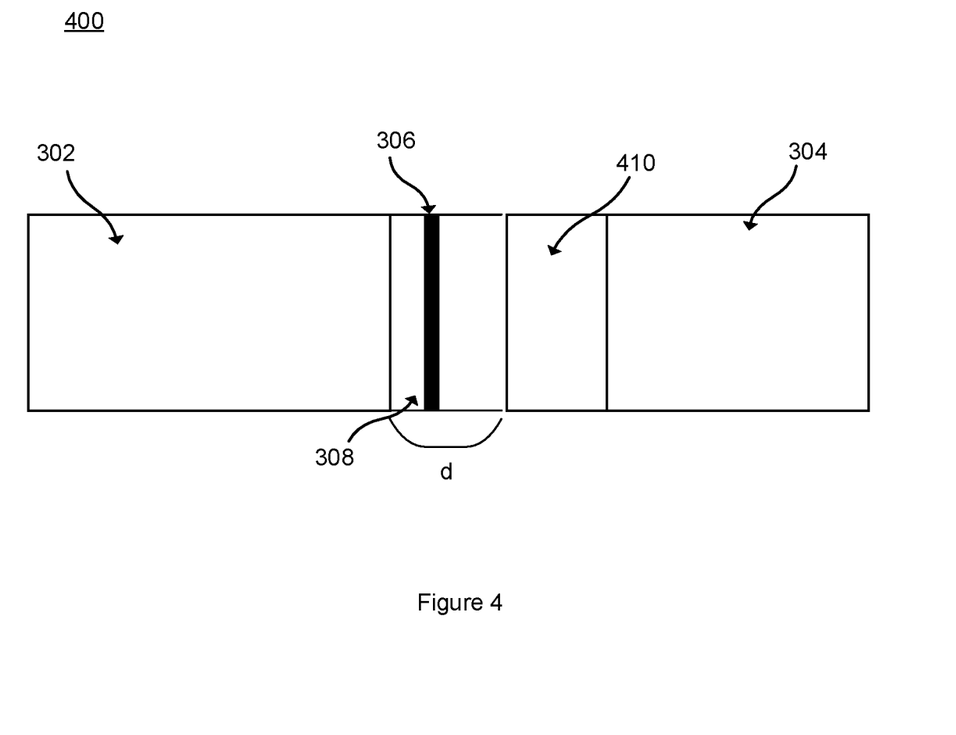
FIG. 4 depicts an embodiment of an asymmetrical thermal contact model.

FIG. 4 depicts an asymmetrical thermal contact model 400 as a layered system. The asymmetrical contact model 400 is similar to the thermal contact model 300, but there is an additional material 410 between the contact region 308 and the material 304.

The temperature of the sensor can be calculated in a similar way as described for thermal contact model 300, but reflection coefficient $R_{23}$ is replaced by an effective reflection coefficient $R_{e23}$, where:

$$R_{e23} = R_{23} + T_{23}T_{32}\sum_{n=1}^{\infty} R_{34}^n R_{32}^{n-1}\left(e^{-\frac{n^2 t_x}{t}} - n\sqrt{\frac{\pi t_x}{t}} * \text{erfc}\left(n\sqrt{\frac{t_x}{t}}\right)\right) \qquad (11)$$

It will be appreciated that with non-linear fitting, the properties of the contact regions in the models 300 and 400 can be found, as described above. In some embodiments, there may be an additional material next to material 304. In such cases, reflection coefficient $R_{34}$ would be replaced by an effective reflection coefficient $R_{e34}$, calculated in the same way. In further embodiments, there can be one or more additional materials next to material 302, and/or there can be one or more additional materials next to material 304. This may allow for the thermal properties of any layered system to be determined by, for example, replacing the reflection coefficient accordingly. Such layered models or systems may describe systems where the planar dimensions are much larger than the through plane dimension.

The above described contact models can be used to determine the thermal property values of the contact regions and the materials in 3-D models. For example, materials such as polystyrene foam, and stainless steel have been modelled using at least above described contact model 100. The results of the model were then iteratively analyzed, using nonlinear fits performed over entire datasets, in order to identify approximate values of the time constant ($t_L$) for each tested sample. The time constant can be used to determine the time window for longer test times to determine accurate thermal properties of materials.

Figure 7:
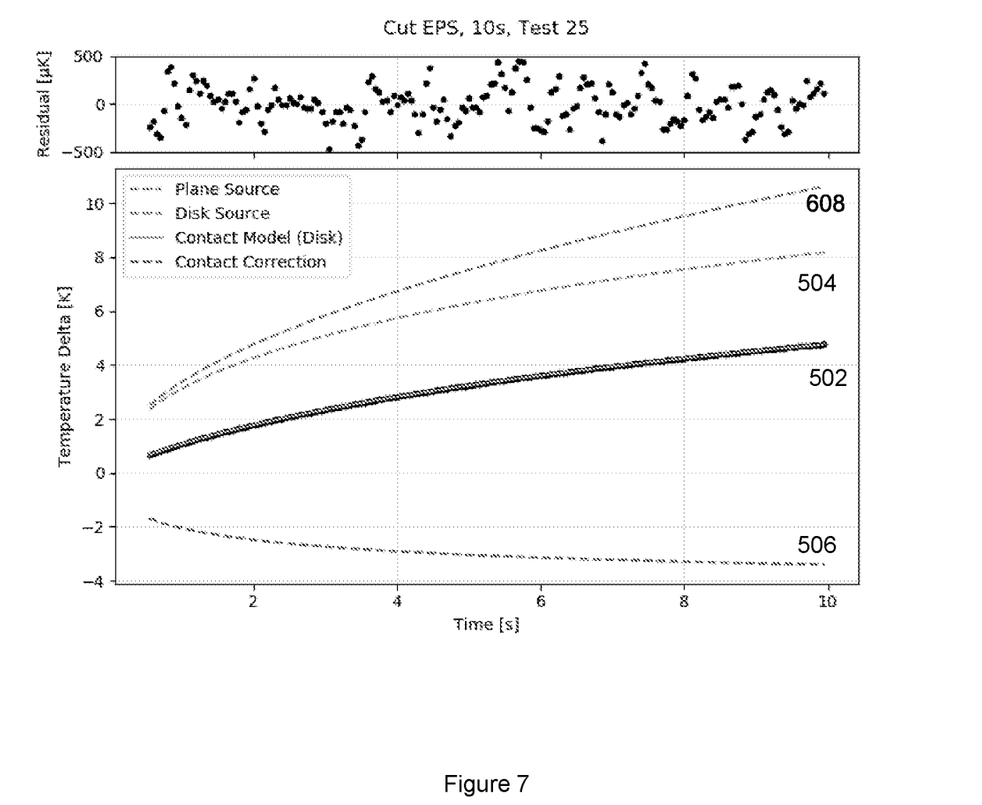
FIG. 7 depicts a graph showing temperature measurements for a thermal contact model using cut EPS.
Figure 8:
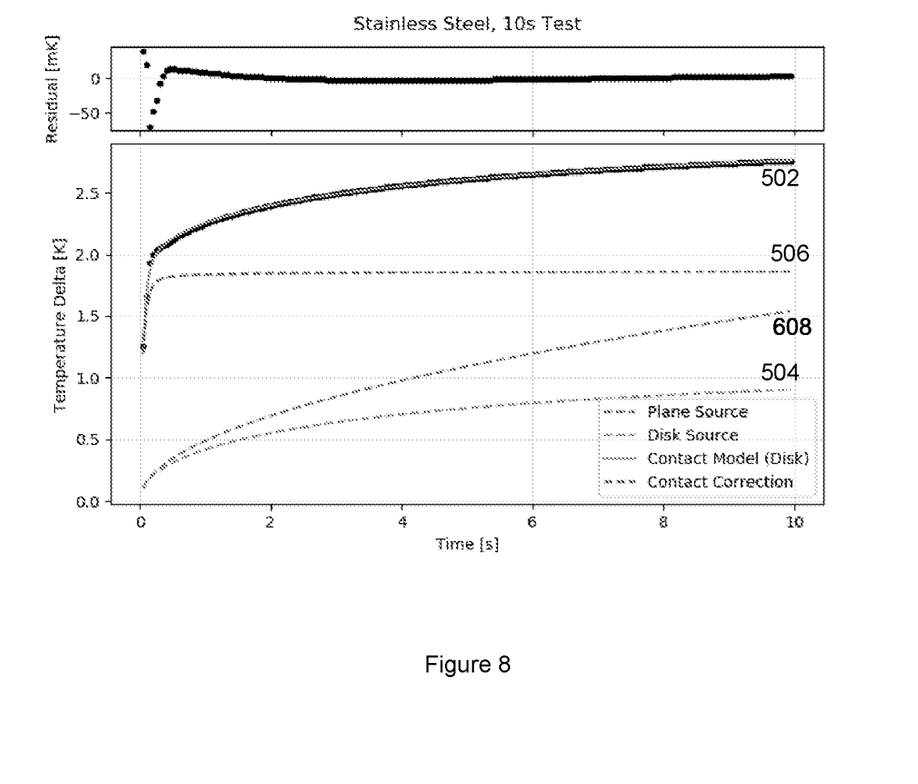
FIG. 8 depicts a graph showing temperature measurements for a thermal contact model using stainless steel 304 for 0 to 10 seconds.
Figure 9:
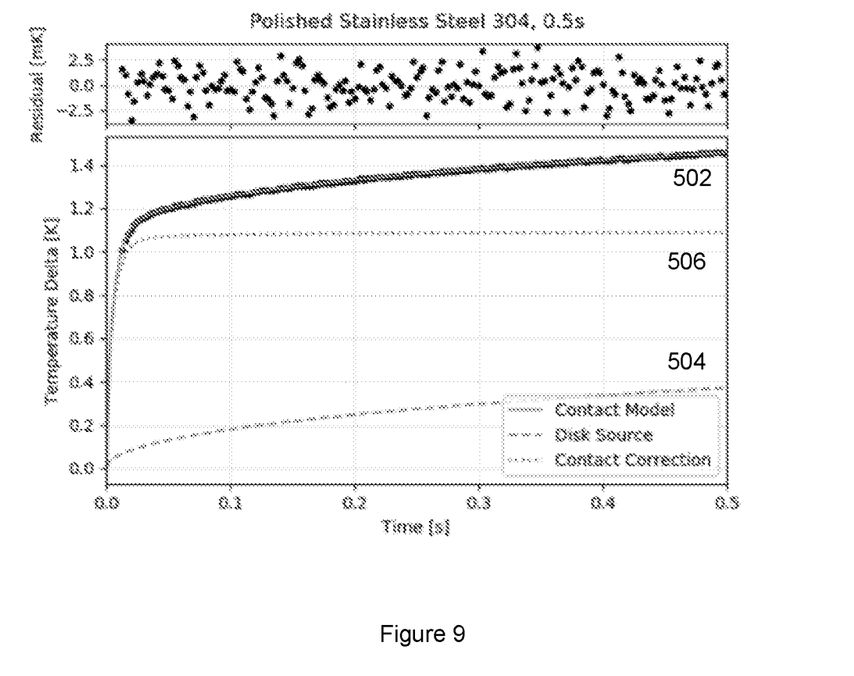
FIG. 9 depicts a graph showing temperature measurements for a thermal contact model using polished stainless steel 304 for 0 to 0.5 seconds.

The contact model 100 can be set up as a 3-D model, with the same material for materials 102 and 104 shaped as disks, and the sensor 106 being similarly shaped as a disk, acting as a plane transient source. The sensor was heated with constant power for a predetermined time of 10 seconds on samples of extruded polystyrene foam as the materials 102, 104 (FIG. 5), on samples of expanded polystyrene foam with both rough surfaces (FIG. 6) and cut surfaces (FIG. 7), and on samples of stainless steel 304 with a roughly sanded surface (FIG. 8). The sensor was heated with constant power for a predetermined time of 0.5 seconds on samples of stainless steel 304 as the materials 102, 104 with polished surfaces (FIG. 9).

Figure 5:
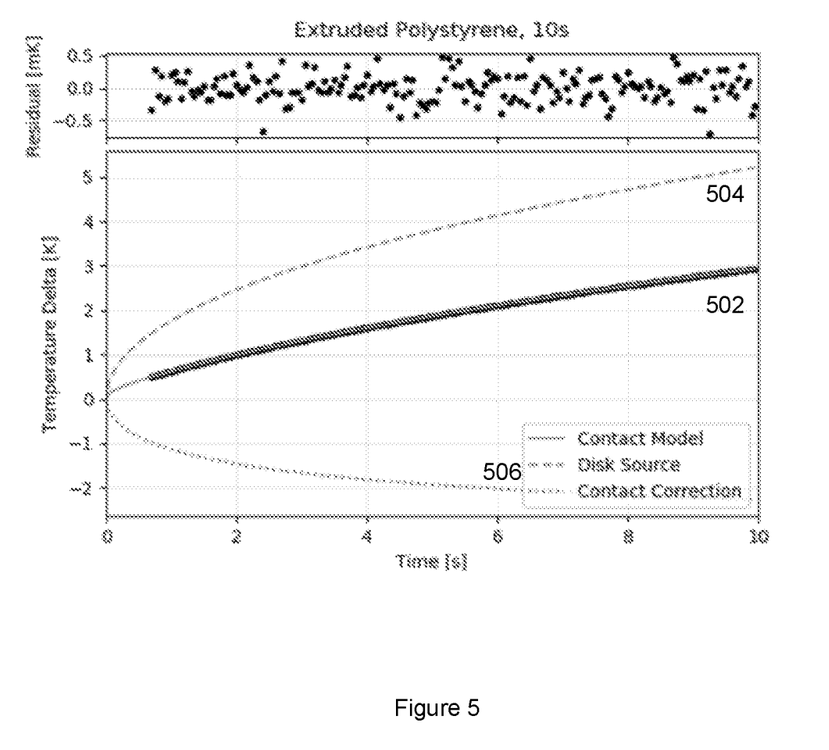
FIG. 5 depicts a graph showing temperature measurements for a thermal contact model using extruded polystyrene.
Figure 6:
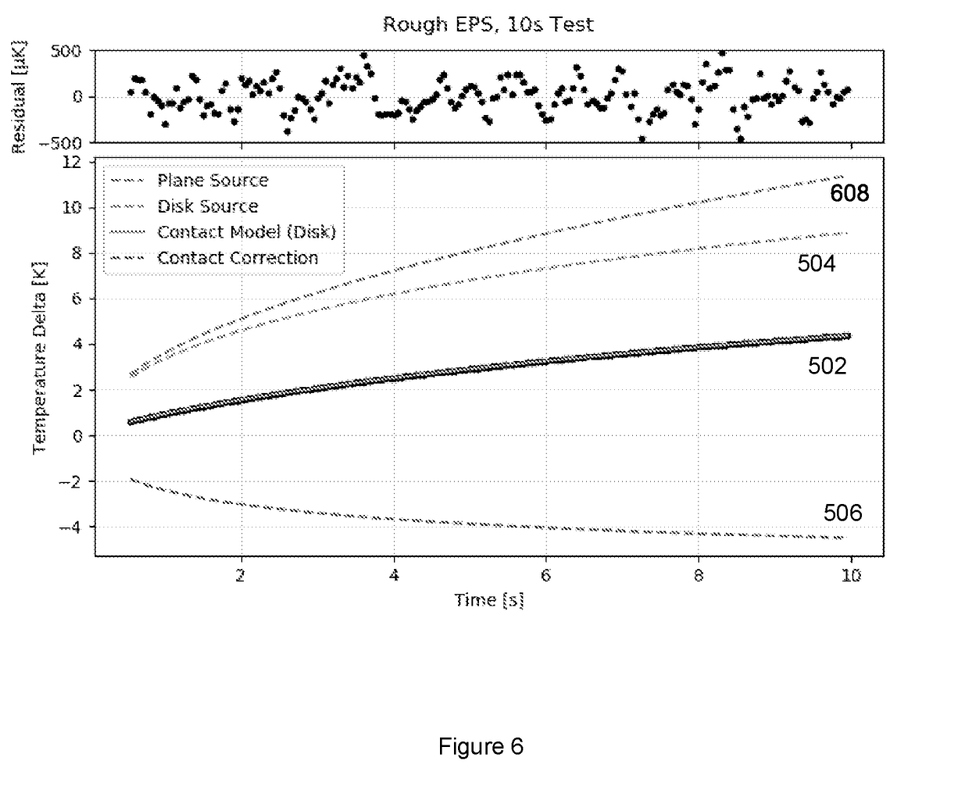
FIG. 6 depicts a graph showing temperature measurements for a thermal contact model using rough EPS.

FIG. 5 depicts a graph showing the temperature for a thermal contact model using extruded polystyrene over 10 seconds. The graph depicts the temperature results of the contact model 502, the temperature of the disk source or sensor 504, and the contact correction 506. It will be appreciated that these reference characters are used in FIG. 6-9 as well to depict the different results. In FIGS. 6-8, the temperature of the plane source 608 is also shown on the graphs. It will be further appreciated that the plane source may be considered as an infinite plane, and the disk source may be considered as finite in radius. The disk source 504 may be a more accurate approximation of the temperature of the source.

F(t) and $T_C(t)$ are plotted as disk source 504 and contact correction 506, respectively, in FIG. 5 to demonstrate the effects of the contact between the material samples. F(t) is the temperature without considering the contact between the materials, and is equal to Equation 5 ($T_{mdl}(t)$), shown above. The temperature results of the contact model 502, shown in the figures, is the corrected form of the model ($T_{3D}(t)$) shown as Equation 4, above.

It will be appreciated that at least the contact correction 506 plotted in FIG. 5 for the extruded polystyrene foam demonstrates pronounced effects due to thermal contact of the material or surfaces of the material. These effects approach a constant temperature offset very slowly, in a manner that is unaccounted for by either a simple power reduction or temperature offset.

FIG. 9 depicts a graph showing temperature measurements for the thermal contact model using polished stainless steel 304 for 0 to 0.5 seconds. F(t) (disk source 504) and $T_C(t)$ (contact correction 506) are plotted to demonstrate the effects of contact between the material or of the polished surfaces of the material. This can also be seen in FIG. 8, where the graph depicts the temperature measurements for roughly sanded stainless steel. It will be appreciated that the effects of the contact or surface of the materials can be seen in FIGS. 8 and 9, particularly with regard to the contact correction 506.

The method of determining thermal properties of contact regions can be used to determine various other properties of the materials and models. For example, the method can be used to determine the time it takes heat to penetrate from the senor into a second material through the contact region, to correct for contact properties in measurements of bulk material properties, to automatically determine an appropriate time window for existing thermal measurement systems to minimize the effects of contact between materials, to calculate or determine the thermal properties of a thin film, and to calculate or determine thermal properties of layered systems. The above models 100-400 may also be used to correct for the finite and non-zero thermal properties of the sensor. It will be appreciated that sensors are generally considered to be of negligible heat capacity and infinite conductivity. The present invention can remove the need for such an approximation.

The method of determining thermal properties of contact regions can be implemented on a computer as a program for determining thermal properties of contact regions, for correcting for contact properties in measurements of bulk material properties, for automatically determining an appropriate time window for existing thermal measurement systems to minimize the effects of contact between materials, for calculating or determining the thermal properties of a thin film, for calculating or determining thermal properties of layered systems, and/or correcting for the finite and non-zero thermal properties of the sensor. When the above determinations are implemented on a computer, the computer may receive data relating to the temperature of the sensor with time. The computer may also receive data relating to known properties of the bulk materials for analysis. The received data may then be used to determine a temperature distribution of the heat of the sensor to one or more materials. The temperature distribution is then iteratively analysed to isolate for thermal properties of the contact between materials. Once the thermal properties are isolated by the iterative analysis, the computer can output the properties. The thermal properties of the contact region that may be outputted may include, but are not limited to, thermal contact conductance, the contact region's inverse thermal contact resistance, and heat capacity per unit area.

In other embodiments, the computer may isolate for the thermal properties of the contact between materials and then perform at least one of correcting for contact properties in measurements of bulk material properties, automatically determining an appropriate time window for existing thermal measurement systems to minimize the effects of contact between materials, determining the thermal properties of a thin film, and determining thermal properties of layered systems. The computer can then output the corrected bulk material properties, the appropriate time window, the thermal properties of a thin film, the thermal properties of the layered system, and/or the corrected finite and non-zero thermal properties of the sensor.

Using the above described thermal contact models 100-400, thermal properties of the contact between materials can be isolated and analyzed, as described above. As depicted in FIGS. 5-9, the contact has pronounced effects on transient plane source models. It will be appreciated that the thermal contact models 100-400 and described method can be used to separate contact thermal quantities from bulk material thermal properties, which can allow for measurements of bulk material properties to be stable over different times and surface finishes.

The method of determining the thermal properties of contact regions, as described herein, can use the data measured and calculated from the beginning of the heating time of the sensor to the end of the heating time of the sensor. With regard to the examples in the figures, this means that the data from t=0 to t=10 seconds or t=0 to t=0.5 seconds. In existing methods, the data must be limited to times when the contact offset is constant. This means that data measured and calculated from the beginning of the heating time should be removed in the analysis of existing systems to be able to determine accurate bulk material thermal properties. In addition, in existing systems, the testing must be run for long enough for the contact offset to become constant. The present method can allow for all of the data to be used, and does not require the sensor to be heated long enough for the contact offset to be constant. For example, the above method does not require a delay of ~$t_L$. The sensor can be heated for a shorter time than done in previous methods. Further, the above models 100-400 may be able to isolate and analyze contact thermal properties independently of the sensor.

It will be appreciated that the above models and methods may be particularly useful for insulators, where short test times are shown to be insufficient for the measurement of any thermal property unless contact is considered. Measurements of effusivity on insulators that do not follow this method are instead measurements of effusance since they are affected by the properties of the contact region and will change with time as the bulk material effusivity begins to dominate.

It would be appreciated by one of ordinary skill in the art that the method and components shown in the figures and described herein may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The invention claimed is:

1. A method comprising:
   receiving temperature data of a sensor;
   determining a temperature distribution of heat penetrating from the sensor to at least one material based on the received temperature data;
   applying a correction to the temperature distribution; to obtain a corrected temperature distribution
   iteratively analyzing the corrected temperature distribution to determine thermal properties of a contact region; and
   outputting the thermal properties of the contact region, the contact region being a region between the sensor and the at least one material.

2. The method of claim 1, wherein the temperature data is the temperature of the sensor with time.

3. The method of claim 1, wherein the contact region includes the sensor and is between two of the at least one materials.

4. The method of claim 1, wherein the iterative analysis is a non-linear fitting analysis.

5. The method of claim 1, further comprising:
   determining thermal properties of the at least one material; and
   determining corrected thermal properties of the at least one material using the thermal properties of the contact region.

6. The method of claim 1, wherein the temperature distribution is determined based on the temperature data from the sensor during an appropriate time window, the method further comprising automatically determining the appropriate time window for the temperature data to determine thermal properties of the at least one material to minimize effects of the contact region.

7. The method of claim 1, wherein there is a thin film between the sensor and the at least one material, and the iterative analysis of the corrected temperature distribution determines thermal properties of the thin film.

8. A method comprising:
   receiving temperature data of a sensor;
   determining a temperature distribution of heat penetrating from the sensor to two or more materials based on the received temperature data;
   applying a correction to the temperature distribution; to obtain a corrected temperature distribution
   iteratively analyzing the corrected temperature distribution to determine thermal properties of a contact region, the contact region being a region between each of the two or more materials; and
   outputting the thermal properties of the contact region.

9. The method of claim 8, wherein the temperature data is the temperature of the sensor with time.

10. The method of claim 8, wherein the sensor is in the contact region.

11. The method of claim 8, wherein the iterative analysis is a non-linear fitting analysis.

12. The method of claim 8, further comprising:
    determining thermal properties of the two or more materials; and
    determining corrected thermal properties of the two or more materials using the thermal properties of the contact region.

13. The method of claim 8, wherein the temperature distribution is determined based on the temperature data from the sensor during an appropriate time window, the method further comprising automatically determining the appropriate time window for the temperature data to determine thermal properties of the two or more materials to minimize effects of the contact region.

14. The method of claim 8, wherein there is at least one thin film between the sensor and at least one of the two or more materials.

15. The method of claim 14, wherein the iterative analysis of the corrected temperature distribution determines thermal properties of the at least one thin film.

16. A method comprising:
    arranging a sensor in a contact region between a first material and a second material;
    heating the sensor for a predetermined time;
    determining a temperature distribution of heat penetrating from the sensor to the first material or the second material;
    iteratively analyzing the temperature distribution; to obtain an iteratively analyzed temperature distribution and determining thermal properties of the contact region from the iteratively analyzed temperature distribution, the contact region being a region between the first material and the second material.

17. The method of claim 16, further comprising applying a correction to the temperature distribution before iteratively analyzing the temperature distribution.

18. The method of claim 16, further comprising:
determining thermal properties of the first material and the second material; and
determining corrected thermal properties of the first material and the second material using the thermal properties of the contact region.

19. The method of claim 16, wherein the temperature distribution is determined based on temperature data from the sensor during an appropriate time window, the method further comprising automatically determining the appropriate time window for the temperature data to determine thermal properties of the first material and the second material to minimize effects of the contact region.

20. The method of claim 16, wherein there is at least one thin film between the sensor and at least one of the first material and the second material; and wherein the iterative analysis of the temperature distribution determines thermal properties of the at least one thin film.

* * * * *

UNITED STATES PATENT AND TRADEMARK OFFICE
CERTIFICATE OF CORRECTION

PATENT NO. : 11,644,432 B2
APPLICATION NO. : 16/902822
DATED : May 9, 2023
INVENTOR(S) : Dale Hume, David Landry and Andrew Evans Page 1 of 1

It is certified that error appears in the above-identified patent and that said Letters Patent is hereby corrected as shown below:

In the Specification

Column 2, Line 62: "...extruded polystyrene;" should read "...extruded polystyrene (EPS);"

Column 4, Line 27: "...little,effect..." should read "...little effect..."

Column 6, Line 27: "...surface of materials..." should read "...surface(s) of materials..."

Column 10, Line 9: "...surface of the materials..." should read "...surface(s) of the materials..."

Signed and Sealed this
Fifteenth Day of August, 2023

Katherine Kelly Vidal
*Director of the United States Patent and Trademark Office*